(12) United States Patent
Paterson

(10) Patent No.: US 8,136,351 B2
(45) Date of Patent: Mar. 20, 2012

(54) SYSTEM AND METHOD FOR FILTERING DIESEL ENGINE EXHAUST PARTICULATES

(75) Inventor: Clark Paterson, Loveland, CO (US)

(73) Assignee: Woodward, Inc., Fort Collins, CO (US)

( * ) Notice: Subject to any disclaimer, the term of this patent is extended or adjusted under 35 U.S.C. 154(b) by 493 days.

(21) Appl. No.: 12/415,236

(22) Filed: Mar. 31, 2009

(65) Prior Publication Data
US 2010/0242449 A1 Sep. 30, 2010

(51) Int. Cl.
*F01N 3/02* (2006.01)
(52) U.S. Cl. .......... 60/311; 60/285; 60/286; 60/297
(58) Field of Classification Search ............ 60/274, 60/284–287, 295–301, 311
See application file for complete search history.

(56) References Cited

U.S. PATENT DOCUMENTS

| | | | |
|---|---|---|---|
| 6,978,604 B2 | 12/2005 | Wang et al. | |
| 6,983,591 B2 * | 1/2006 | Kondo et al. | 60/295 |
| 7,137,247 B2 * | 11/2006 | Koga et al. | 60/295 |
| 7,231,291 B2 * | 6/2007 | Dollmeyer et al. | 701/114 |
| 7,263,825 B1 | 9/2007 | Wills et al. | |
| 7,275,365 B2 * | 10/2007 | Zhan et al. | 60/295 |
| 7,406,822 B2 | 8/2008 | Funke et al. | |
| 7,484,357 B2 * | 2/2009 | Dollmeyer et al. | 60/274 |
| 2005/0198945 A1 | 9/2005 | Okugawa et al. | |
| 2007/0056272 A1 | 3/2007 | Dollmeyer et al. | |
| 2007/0056274 A1 | 3/2007 | Wills | |
| 2007/0130922 A1 * | 6/2007 | Dye et al. | 60/295 |
| 2007/0130923 A1 * | 6/2007 | Dye et al. | 60/295 |
| 2010/0126145 A1 * | 5/2010 | He et al. | 60/286 |

* cited by examiner

*Primary Examiner* — Thomas Denion
*Assistant Examiner* — Jesse Bogue
(74) *Attorney, Agent, or Firm* — Reinhart, Boerner, Van Deuren, P.C.

(57) ABSTRACT

A diesel particulate filtering system that includes a filter configured to capture exhaust particulates from a diesel engine, a regeneration device configured to heat exhaust gases from the diesel engine prior to the exhaust gases reaching the filter, and a controller configured to control operation of the regeneration device, wherein the controller is further configured to turn the regeneration device on when a weighted average of a plurality of normalized parameter values exceeds a threshold value.

20 Claims, 2 Drawing Sheets

SYSTEM AND METHOD FOR FILTERING DIESEL ENGINE EXHAUST PARTICULATES

FIELD OF THE INVENTION

This invention relates generally to diesel exhaust systems, and more particularly, to diesel particulate filter systems.

BACKGROUND OF THE INVENTION

Increasing environmental restrictions and regulations are causing diesel engine manufacturers and packagers to develop technologies that improve and reduce the impact that operation of such engines have on the environment. As a result, much design work has gone into the controls that operate the combustion process within the engine itself in an attempt to increase fuel economy and reduce emissions such as $NO_x$ and particulates. However, given the operating variables and parameters over which a diesel engine operates and given the tradeoff between $NO_x$ and particulate generation, many engine manufacturers and packagers have found it useful or necessary to apply exhaust after-treatment devices to their systems. These devices are used to filter the exhaust gas flow from the diesel engine to remove or reduce to acceptable levels certain emissions. Such devices are particularly useful in removing exhaust particulates, or soot, from the exhaust gas flow before such soot is released into the environment.

One such exhaust after-treatment device is called a Diesel Particulate Filter (DPF). The DPF is positioned in the exhaust system such that all exhaust gases from the diesel engine flow through it. The DPF is configured so that the soot particles in the exhaust gas are deposited in the filter substrate of the DPF. In this way, the soot particulates are filtered out of the exhaust gas so that the engine or engine system can meet or exceed the environmental regulations that apply thereto.

While such devices provide a significant environmental benefit, as with any filter, problems may occur as the DPF continues to accumulate these particulates. After a period of time, the DPF becomes sufficiently loaded with soot such that the exhaust gases experience a significant pressure drop passing through the increasingly restrictive filter. As a result of operating with an overly restrictive filter, the engine thermal efficiency declines because the engine must work harder and harder simply to pump the exhaust gases through the loaded DPF. Besides the reduced thermal efficiency, a second and potentially more dangerous problem may occur. Because the soot accumulated in the DPF is flammable, continued operation with a loaded DPF raises the serious potential for uncontrolled exhaust fires if, and when, the accumulated soot is eventually ignited and burns uncontrollably.

To avoid either occurrence, one of several possible filter heating devices is typically incorporated upstream of the DPF to periodically clean the filter. These filter heating devices are used periodically to artificially raise the temperature of the exhaust stream to a point at which the accumulated soot will self-ignite. When initiated at a time before the soot loading of the DPF becomes excessive, the ignition and burn-off will occur in a safe and controlled fashion. This process of burning the soot in such a controlled manner is called regeneration. The control of the method to generate the supplemental heat necessary to increase the temperature in the DPF is critical to safe and reliable regeneration. Typically, the acceptable temperature range for regeneration is from 600 to 900° C. Temperatures below this range are insufficient to ignite the accumulated soot, and temperatures above this range may cause thermal damage to the filter media.

Many methods have been devised to provide the auxiliary heat necessary to initiate regeneration. For example, the operating parameters of the diesel engine may be modified in such a manner to cause the exhaust temperature to rise to a level sufficient for proper operation of the downstream particulate filter. It is also possible to inject hydrocarbon fuel into the exhaust of a diesel engine immediately before the exhaust passes through a diesel oxidation catalyst (DOC) positioned upstream of the particulate filter. The DOC converts the excess hydrocarbon fuel into heat by means of the catalytic reaction of the catalyst, thus increasing the exhaust gas temperature prior to its passage through the particulate filter. Supplemental heat may also be generated in the exhaust flow by use of an auxiliary electrical heater, or a microwave heater, placed within the exhaust path. This supplemental heat is added to the exhaust gas prior to its passage through the particulate filter. As an alternative to the use of a microwave or electric heater, another method of filter regeneration uses a fuel-fired burner to heat the exhaust gas prior to the DPF. Such a burner requires a diesel fuel supply, an auxiliary air supply, and an ignition system.

The rate at which soot accumulates in the filter depends primarily upon the operating regime of the engine. As such, besides the selection of the particular method or device to be used to heat the exhaust gas to enable regeneration, the engine manufacturer or packager must also determine when to initiate the regeneration process. If regeneration is initiated too soon, when the DPF is only lightly loaded, the process will be inefficient. If the regeneration is not initiated until the DPF is heavily loaded, the overall engine efficiency would have been unduly reduced as discussed above, and there is a risk that the soot may self-ignite and/or that the burn may be unsafe and uncontrolled.

In an attempt to properly determine when to initiate the regeneration process, several sensors and control algorithms have been developed. These sensors and control algorithms may be used to estimate the soot loading of the DPF so that regeneration can be initiated only after soot loading could cause an engine efficiency reduction but before excessive loading occurs that would actually result in such an efficiency reduction and increased potential for self-ignition. However, these control algorithms typically depend on the monitoring of certain triggering events which generate boolean (i.e. true/false) responses based on comparisons to some predetermined limit. These boolean responses form the inputs for the control algorithm.

One drawback of this method is that it may have a very discrete response. That is, one triggering event may determine when regeneration is initiated without taking a variety of other relevant factors into account. Also, by basing the initiation of regeneration on the boolean response of certain triggering events, there is the potential that a faulty or broken sensor could, for example, initiate regeneration events much more frequently than needed, or could delay regeneration far longer than is desirable. A control system that relies on analog responses, and that takes into account the values of a variety of relevant parameters could avoid this problem It would therefore be desirable to have a system and method of controlling the initiation of the regeneration process, wherein the system and method are capable of evaluating the analog responses of a variety of factors such that regeneration events are efficiently controlled and initiated when truly needed. Embodiments of the invention provide such a system and method of controlling initiation of the regeneration process. These and other advantages of the invention, as well as additional inventive features, will be apparent from the description of the invention provided herein.

BRIEF SUMMARY OF THE INVENTION

In one aspect, embodiments of the invention provide a diesel particulate filtering system that includes a filter configured to capture exhaust particulates from a diesel engine, a regeneration device configured to heat exhaust gases from the diesel engine prior to the exhaust gases reaching the filter, and a controller configured to control operation of the regeneration device, wherein the controller is further configured to turn the regeneration device on when a weighted average of a plurality of normalized parameter values exceeds a threshold value.

In another aspect, embodiments of the invention provide a method for controlling the operation of a diesel particulate filtering system that includes capturing in a filter particulates from the exhaust of a diesel engine, generating a normalized value for each of a plurality of parameters, the parameters indicative of the need to initiate a regeneration event, assigning a weighting factor to each of the plurality of parameters, the weighting factor to be applied to the corresponding normalized value, calculating a weighted average value of the plurality of parameters, and initiating a regeneration event when the weighted average value exceeds a threshold value.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
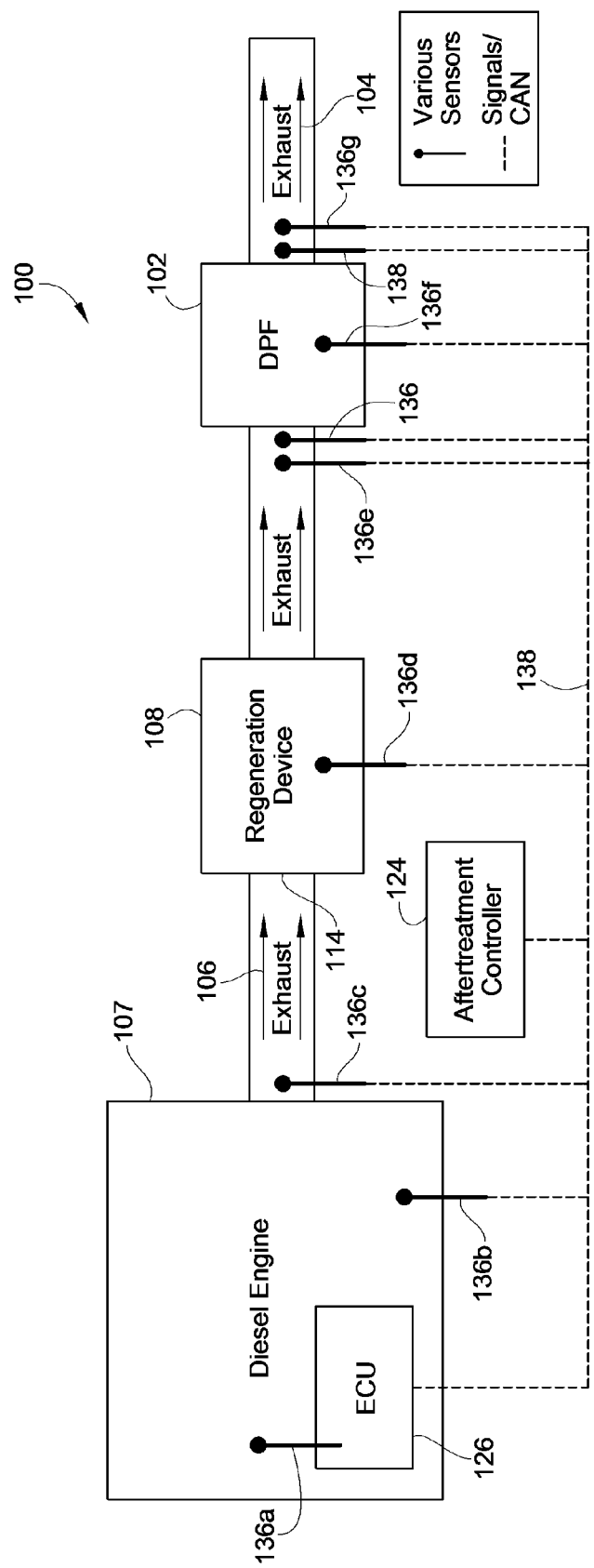
FIG. 1 is a block diagram that illustrates a diesel engine particulate filtering system according to an embodiment of the invention.

There is illustrated in FIG. 1 an embodiment of a diesel particulate filtering system 100 constructed in accordance with the teachings of the present invention that is configured to determine an appropriate time to initiate regeneration of a diesel particulate filter (DPF) 102. The diesel particulate filtering system 100 includes a DPF 102 installed before or upstream of an exhaust outlet 104 to filter out particulates from the exhaust gases of a diesel engine 107. In order to clean the collected particulates, e.g., soot, off of the DPF 102, a regeneration device 108 is located upstream of the DPF 102, but downstream from an exhaust inlet 106 from the diesel engine 107. Such a regeneration device 108 may be any source of auxiliary heat, such as a fuel-fired burner, an electrical burner, a microwave burner, a DOC, or may even generate heat via modified operation of the diesel engine 107. The engine exhaust gases flow through openings 114 of the regeneration device 108, and then through the DPF 102 before exiting into the environment via the exhaust outlet 104.

It should be recognized, however, that, in alternate embodiments of the invention, the high energy sparking and leakage current monitoring may be incorporated in a separate controller that may or may not include ion sensing capabilities. As illustrated, the aftertreatment controller 124 may be able to communicate with an engine control unit (ECU) 126. It is also envisioned that the diesel particulate filtering system 100 will have a plurality of sensors 136a-136f positioned at different locations throughout the system to collect temperature data, pressure data, chemical and/or oxygen concentration, etc. In an embodiment of the invention, the aftertreatment controller 124 receives the sensory input data from sensors 136a-136f over a CAN bus 138, and issues commands to regeneration device 108 and ECU 126 over the same CAN bus 138.

Figure 2:
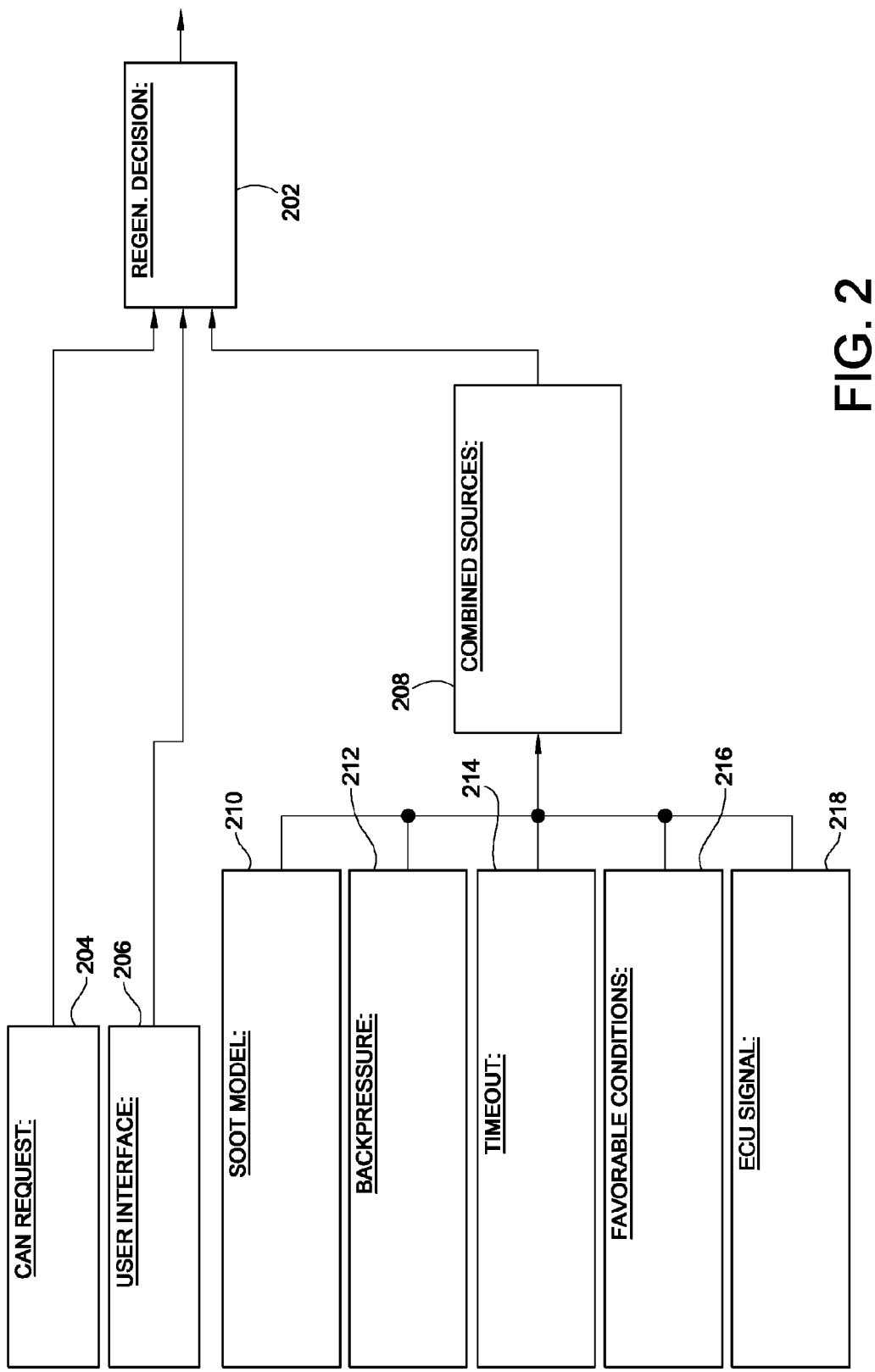
FIG. 2 is a block diagram illustrating the parameters used in the determination of when to initiate a regeneration event according to an embodiment of the invention.

FIG. 2 is a block diagram illustrating the parameters used to determine the initiation of a regeneration event according to an embodiment of the invention. In this embodiment, the regeneration decision 202 is determined by three inputs: 1) a CAN Communication system 204 output; 2) a User Interface 206 output; and 3) a Combined Sources module 208 output. The vehicle operator may request a regeneration event via the User Interface 206. A request for a regeneration event may be generated by a device connected to the CAN communications bus 138. The Combined Sources module 208 is configured to initiate a regeneration event base on a comparison of a weighted average of a set of normalized input values to a threshold value. In one embodiment of the invention, the regeneration decision 202 could be configured to be initiated by any one of the inputs. For example, a user request alone, or a request from a device connected to the CAN communication system alone, or a regeneration signal from the Combined Sources module 208 alone could initiate a regeneration event. In another embodiment of the invention, the regeneration decision 202 is based on a weighted average of these three inputs.

The Combined Sources module 208 has five input modules: 1) Soot Model module 210; 2) Backpressure module 212; 3) Timeout module 214; 4) Favorable Conditions module 216; and 5) ECU Signal module 218. The normalized or scaled values of these five input parameters are combined in a weighted average. The weighting can be constant and may be based on various factors including, for example, sensor reliability or accuracy. When the weighted average of these parameters is above some predetermined threshold, a regeneration event is initiated. However, as will be explained below, the weighting can also be dynamically set based, in part, on operational conditions.

The Soot Model module 210 provides an integration of model or map-based soot production values and generates a normalized soot produced value. For example, a Combined Sources module 208 value of 100 could be selected as the critical value for required regeneration. If, for example, 4 g/L of soot loading in the DPF 102 is the desired loading for regeneration, then the soot loading signal would be scaled or normalized such that the Soot Model module 210 outputs a value of 100, which is multiplied by the scaling factor when there is 4 g/L of soot loading in the filter. The value generated by the Soot Model module 210 then becomes part of the weighted average that is output from the Combined Sources module 208. Soot production may be determined by sensory input from the diesel particulate filter system. In an alternate embodiment of the invention, the Soot Model 210 gets data from the engine control unit (ECU) 126. The data from the ECU 126 may be proprietary to the vehicle owner/operator. Typically, that ECU data will provide a soot production value to the aftertreatment controller 124 by correlating the soot production value to engine speed, temperature, engine load, etc.

The Backpressure module 212 determines a pressure differential across the DPF 102 to predict soot loading, and generates a normalized value for the pressure differential. In an embodiment of the invention, the weighting factor used by the Backpressure module 212 may be adjusted dynamically based on operational conditions. For example, in a diesel-powered vehicle operating at a high exhaust flow rate, the pressure differential may be of sufficient amplitude to be accurately measured by the low-resolution sensors typically used in automotive application. At these high flow rates, the difference in pressure differential readings between a soot-loaded DPF 102 and a clean DPF 102 is significant and may be accurately measured. But, in the same vehicle operating at a low exhaust flow rate, the difference in pressure differential readings between a soot-loaded DPF 102 and a clean DPF 102 may be within the noise level of the sensor. Compensation for this flow phenomenon could involve increasing the weighting factor for Backpressure module 212 at high exhaust flow rates and decreasing the weighting factor at low exhaust flow rates. Another operational condition that may be taken into account when determining the appropriate weighting factor is ambient temperature. For example, extreme cold temperatures can potentially damage a pressure sensor 136a-136f if there is some moisture in the sensor. The Backpressure module 212 can be configured to reduce the weighting when the ambient temperature drops low enough.

In one exemplary embodiment, where a Combined Sources module 208 value of 100 is the critical value for regeneration, and where a pressure differential of 20 kPa across the DPF 102 is the desired pressure differential to initiate regeneration, the Backpressure module 212 is configured to output a value of 100 multiplied by the appropriate scaling factor when the pressure differential across the DPF 102 reaches 20 kPa. The normalized value output by Backpressure module 212 then becomes part of the weighted average that is output from the Combined Sources module 208. As explained above, that normalized value may fluctuate with the exhaust flow rate.

The Timeout module 214 monitors the amount of time since the last successful regeneration event, and generates a normalized time value. This module allows for a regeneration event to be initiated after a predetermined time period ensuring at least a minimum number of regeneration events. In this manner, a regeneration event will be initiated after a sufficiently long period, regardless of the operational conditions.

The Favorable Conditions module 216 provides a model or map-bases value indicating the favorability of conditions for initiating a regeneration event. The map or model used is configured to generate a normalized favorable condition value based on certain parameters. For example, in a case where engine speed is low and the ambient temperature is high, and where the exhaust gases have a high oxygen concentration, the engine speed load map may determine that conditions for a regeneration event are unfavorable because the DPF 102 would heat up too quickly, potentially resulting in damage to the DPF 102. Conversely, in a case where engine speed is high and the ambient temperature is low, and the oxygen concentration in the exhaust gases is also low, the engine speed load map may determine that conditions for a regeneration event are unfavorable because it would take too long to generate enough heat to remove the soot from the DPF 102. In either case, the value output by the Favorable Condition module 216 would indicate an unfavorable condition (e.g., a low value or possibly a negative value) effectively delaying the initiation of a regeneration event.

When engine speed, temperature, and oxygen concentration combine to produce a condition favorable for regeneration, the Favorable Condition module 216 outputs, for example, a relatively high value or possibly any positive value that effectively accelerates the initiation of a regeneration event. However, even if conditions for regeneration are unfavorable, other factors (i.e., the scaled outputs from other modules) may dictate that a regeneration event is needed. As such, a regeneration event will be initiated even if the conditions are unfavorable. Likewise, even when conditions for regeneration are favorable, the scaled outputs of other modules may not be of a sufficient value to initiate a regeneration event. In this case, a regeneration event would not be initiated even in favorable conditions.

The ECU Signal module 218 provides for the integration of an ECU 126 signal to determine, for example, fuel consumption, soot production rate, etc., and then generates a normalized ECU 126 signal value. In some vehicles, there is a central processor, often referred to as the engine control unit (ECU) 126, which is configured to run algorithms to determine parameters such as fuel consumption, oil consumption, and soot production. Data from the ECU 126 can be transmitted to the aftertreatment controller 124. In some cases, the algorithms run by the ECU 126 are proprietary to the owner/operator of the vehicle. The ECU Signal module 218 can be configured to take the signal from the proprietary ECU 126 and normalize the signal values.

In an embodiment of the invention, the normalized output from each of the five modules is multiplied by a weighting factor. The weighted values are summed and then divided by the sum of the weighting factors. The Combined Sources module 208 compares the weighted average to a predetermined threshold, and, if the weighted average is greater, initiates a regeneration event. One benefit of using the weighted average of several normalized values is that what might normally be considered a minor factor in the regeneration decision, such as favorable conditions, can tip the scales and trigger a regeneration event even if the normalized values of other, typically more critical, parameters are close to, but not over, the threshold value for regeneration. This helps to optimize the regeneration initiation process. As a result, regeneration may occur before there is a noticeable degradation in diesel engine 107 performance.

Further, the above-mentioned adaptive weighting factors, which allow the weighting factors to be dynamically adjusted during diesel engine 107 operation, allows the aftertreatment controller 124 to compensate for sensors that have been determined to be broken or inaccurate by reducing the weighting of the outputs from those sensors. For example, under certain operational conditions, the weighting of some parameters may be adjusted to minimize or even eliminate those parameter values contribution to the decision to initiate regeneration.

The system is also flexible enough to allow for additional inputs to be used in the regeneration decision 202. For example, a vehicle operator may install a specialized soot sensor (not shown) to increase the accuracy of the determination of soot loading in the filter. In such a case, a soot sensor module could be configured to normalize the output of the soot sensor and provide that value to the Combined Sources module 208. As with the other modules, the weighting given to the soot sensor module could be dynamically adjusted to take into account relevant operating conditions and the likely accuracy of the sensor.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A diesel particulate filtering system comprising:
   a filter configured to capture exhaust particulates from a diesel engine;
   a regeneration device configured to heat exhaust gases from the diesel engine prior to the exhaust gases reaching the filter; and
   a controller configured to control operation of the regeneration device;
   wherein the controller is further configured to turn the regeneration device on when a weighted average of a plurality of normalized parameter values exceeds a threshold value; and
   wherein the plurality of normalized parameter values comprises each of a normalized soot model value, a normalized timeout value, a normalized backpressure value, a normalized favorable conditions value, and a normalized ECU signal value.

2. The particulate filtering system of claim 1, wherein the weighting of the plurality of normalized parameter values can be adjusted dynamically based on an operational condition.

3. The particulate filtering system of claim 2, wherein the operational condition comprises an exhaust flow rate from the diesel engine.

4. The particulate filtering system of claim 2, wherein the operational condition comprises an ambient temperature.

5. The particulate filtering system of claim 1, wherein the normalized ECU signal value is at least partially determined by one of a fuel consumption rate and a soot production rate.

6. The particulate filtering system of claim 1, wherein turning on the regeneration device comprises initiating a regeneration event, and wherein the normalized timeout value is at least partially determined by the amount of time since the last successful regeneration event.

7. The particulate filtering system of claim 1, wherein the normalized backpressure value is at least partially determined by the pressure differential across the filter.

8. The particulate filtering system of claim 1, wherein the normalized favorable conditions value is at least partially determined by an oxygen concentration in the diesel engine exhaust.

9. The particulate filtering system of claim 8, wherein the normalized favorable conditions value is at least partly determined by an ambient temperature.

10. The particulate filtering system of claim 9, wherein the normalized favorable conditions value is at least partly determined by a speed of the diesel engine.

11. The particulate filtering system of claim 1, wherein the normalized soot model value is at least partially determined by a calculation of soot loading on the filter.

12. The particulate filtering system of claim 1, wherein the regeneration device comprises one of an electric heater, a microwave heater, and a fuel-fired heater.

13. A method for controlling the operation of a diesel particulate filtering system comprising:
   capturing in a filter particulates from the exhaust of a diesel engine;
   generating a normalized value for each of a plurality of parameters, the parameter values indicative of a need to initiate a regeneration event;
   assigning a weighting factor to each of the plurality of parameters, the weighting factor to be applied to the corresponding normalized value;
   calculating a weighted average value of the plurality of parameters;
   initiating a regeneration event when the weighted average value exceeds a threshold value;
   wherein generating a normalized value for each of a plurality of parameters comprises generating a normalized value for each of a soot model value, a timeout value, a backpressure value, a favorable conditions value, and an ECU signal value.

14. The method of claim 13, wherein assigning a first weighting factor to each of the plurality of parameters comprises assigning a weighting factor based on an operational condition.

15. The method of claim 14, wherein assigning a weighting factor based on an operational condition comprises assigning a weighting factor based on an exhaust flow rate of the diesel engine.

16. The method of claim 14, wherein assigning a weighting factor based on an operational condition comprises assigning a weighting factor based on an ambient temperature.

17. The method of claim 14, wherein assigning a weighting factor to each of the plurality of parameters comprises changing the first weighting factor to a second weighting factor different from the first weighting factor due to a change in the operational condition.

18. The method of claim 13, wherein generating a normalized soot model value comprises generating a value at least partially determined by a calculation of soot loading on the filter.

19. The method of claim 13, wherein generating a normalized backpressure value comprises generating a value at least partially determined by the pressure differential across the filter.

20. The method of claim 13, wherein generating a normalized favorable conditions value comprises generating a value at least partially determined by one of an oxygen concentration in the diesel engine exhaust, an ambient temperature, and a speed of the diesel engine.

* * * * *